United States Patent [19]

Mori

[11] Patent Number: 5,333,706
[45] Date of Patent: Aug. 2, 1994

[54] BRAKE APPARATUS FOR A VEHICLE

[75] Inventor: Masatomo Mori, Chiba, Japan

[73] Assignees: Akebono Brake Industry Co., Ltd., Tokyo; Akebono Research and Development Centre Ltd., Saitama, both of Japan

[21] Appl. No.: 962,099

[22] Filed: Oct. 16, 1992

[30] Foreign Application Priority Data

Oct. 22, 1991 [JP] Japan .................. 3-273899
Jan. 13, 1992 [JP] Japan .................. 4-004141

[51] Int. Cl.$^5$ .............................................. B60T 8/50
[52] U.S. Cl. .................................. 188/156; 188/161; 318/371
[58] Field of Search ............... 188/156, 158, 159, 161, 188/162, 71.1, 72.1, 72.3; 303/113.4; 318/362, 373, 373, 375, 376, 381, 371

[56] References Cited

U.S. PATENT DOCUMENTS

| | | | |
|---|---|---|---|
| 2,590,034 | 3/1952 | Piron ............................ | 318/362 |
| 4,093,900 | 6/1978 | Plunkett ....................... | 318/376 X |
| 4,392,098 | 7/1983 | Min .............................. | 318/371 X |
| 4,475,075 | 10/1984 | Munn ............................ | 188/156 X |
| 4,602,702 | 7/1986 | Ohta et al. ..................... | 188/158 X |
| 4,649,329 | 3/1987 | Wickham ........................ | 318/372 |
| 4,658,939 | 4/1987 | Kircher et al. ................. | 188/156 |
| 4,671,577 | 6/1987 | Woods .......................... | 188/159 X |
| 4,734,604 | 3/1988 | Sontheimer et al. .......... | 188/171 X |
| 4,795,002 | 1/1989 | Burgei et al. ................. | 188/156 X |
| 4,932,726 | 6/1990 | Iwata et al. ................... | 303/105 X |
| 4,941,553 | 7/1990 | Harrison ....................... | 188/156 |
| 4,970,649 | 11/1990 | Matsuda ........................ | 303/103 X |
| 4,986,614 | 1/1991 | Ricker et al. .................. | 303/115.2 |
| 5,000,523 | 3/1991 | Mikhaeil-Boules et al. .... | 303/115.2 |
| 5,061,883 | 10/1991 | Asano et al. .................. | 318/362 X |
| 5,169,215 | 12/1992 | Takata ........................... | 303/100 X |
| 5,172,961 | 12/1992 | Inoue et al. ................... | 303/100 |

FOREIGN PATENT DOCUMENTS

| | | | |
|---|---|---|---|
| 0342264 | 11/1989 | European Pat. Off. ........ | 188/161 |
| 0172967 | 9/1984 | Japan ............................. | 188/161 |
| 0005301 | 1/1989 | Japan ............................. | 188/161 |
| 0171371 | 7/1990 | Japan ............................. | 188/161 |
| 3-221872 | 9/1991 | Japan . | |
| 517722 | 6/1976 | U.S.S.R. ....................... | 188/156 |

Primary Examiner—Robert J. Oberleitner
Assistant Examiner—Peter M. Poon
Attorney, Agent, or Firm—Finnegan, Henderson, Farabow, Garrett & Dunner

[57] ABSTRACT

A vehicle brake system includes a wheel shaft to which a rotor is fixedly mounted for rotation relative to a stator. Rotor coils are mounted to the rotor in close running relation with stator coils mounted by the stator. The stator also mounts a disc brake caliper and an electric actuator for pressing brake pads against surfaces of the rotor. A control circuit selectively, electrically energizes the rotor coils to produce electromagnetic braking and/or the electric actuator to produce frictional braking by the disc brake in accordance with input signals indicating the magnitude of the depression force exerted on a brake pedal, vehicle speed, and braking torque in a manner to harmonize braking action with the braking demands of the driver.

16 Claims, 4 Drawing Sheets

BRAKE APPARATUS FOR A VEHICLE

BACKGROUND OF THE INVENTION

The present invention relates to a brake apparatus for use in a vehicle and more particularly to a control system for a vehicular brake apparatus that does not utilize fluid pressure such as hydraulic pressure or air pressure.

In conventional brake apparatuses for a vehicle, for example drum brake and disc brake apparatuses, fluid pressure generated by depressing a brake pedal is boosted by a booster device and transmitted to a brake apparatus through hydraulic pressure lines to actuate the brake.

In conventional brake apparatuses of this type, loss of pressure transmitted through the lines is relatively large, and thus efficiency of the brake apparatus has been less than satisfactory. Further, locations for the components are limited because the brake lines require significant space.

Furthermore, in the conventional brake apparatus, since the braking force is achieved only by a frictional force between a braked member such as a rotor and a friction material such as a pad, considerable noise due to drag is generated during the braking operation, and the fade phenomenon, which is a serious problem, sets in if the braking operation continues for a long time. Moreover, when an auxiliary brake system, such as an antilock control system or traction control system is employed, an extra actuator is required so that not only the number of components increases, but also manufacturing cost.

Moreover, since control of braking force is determined by the degree of brake pedal depression in a conventional apparatus, the brake control does not harmonize with the driver's feel of how hard the brake pedal should be depressed. That is, the depressing force applied to the brake pedal is not always in proportion to the deceleration rate of the vehicle. Therefore, if the depressing force applied to the brake pedal is not released shortly before the vehicle completely stops, an uncomfortable jolt is experienced by the driver.

SUMMARY OF THE INVENTION

The present invention was made in view of the foregoing difficulties experienced with conventional brake apparatuses. Accordingly, an object of the invention is to provide a highly reliable brake apparatus for a vehicle, which does not require fluid brake lines and is capable of controlling the brake force in harmony with the driver's feel of the braking action.

The above and other objects of the invention can be achieved by the provision of a brake apparatus which includes a braked member rotatably mounted in a stator by a braked shaft and a rotor coil mounted on the braked member for rotation therewith. A stator coil is secured to the stator adjacent to the rotor coil, and an electrical actuator includes a friction member which is actuated to frictionally engage and disengage a surface of the rotating braked member. A stroke depression force sensor, engaged with a brake pedal, sends detection signals to a control circuit which is electrically connected to the rotor coil, stator coil, and electrical actuator. The control circuit, in response to the detection signals indicating the depression force exerted on the brake pedal by the driver, selectively, electrically activates a first brake operation in which the rotor coil is electrical energized and a second brake operation in which the electrical actuator is actuated while the rotor coil is also energized.

According to the system of the invention thus constructed, braking operations take place only in response to electric signals supplied from the control circuit. Consequently, fluid pressure brake lines are not utilized, and thus inefficiencies due to losses of brake pressure are avoided. Thus, braking operations in accordance with the present invention can efficiently be achieved. Further, since space for the running of electric wires, instead of brake fluid lines, is required, designs of components arranged inside the vehicle body can be more freely selected.

Moreover, the system of the invention automatically determines whether, during a braking operation, calm braking action is necessary, in which either an electromagnetic braking force (electromagnetic brake) generated by energization of the rotor coil or frictional braking force generated by activation of the electric actuator (disc or drum brake) is to be utilized, or a rapid braking action is necessary in which both the disc brake (or drum brake) and the electromagnetic brake are activated. Hence, the brake system according to the present invention consistently performs an accurate and appropriate braking operation whenever the brake pedal is depressed.

In the above regards, for example, when a driver depresses the brake pedal calmly, only the electromagnetic brake is operated to obtain a deceleration rate which the driver normally expects to feel. If the brake pedal is rapidly and strongly depressed, on the other hand, the need for rapid braking action is recognized, and both the electromagnetic brake and the disc brake (or drum brake) are activated to achieve a rapid stop and thus avoid a collision.

Generally, if the depressing force applied to the brake pedal is not released immediately before the vehicle completely stops, an uncomfortable jolt is caused. However, according to another aspect of the present invention, brake torque is detected to determine braking force which, if not in a linear relationship with the brake pedal depression force, is automatically increased or decreased so that the braking force can be harmonized with the driver's expected braking action determined by the brake pedal depression force.

In any event, in the braking system according to the present invention, the brake operation is controlled to harmonize with the driver's braking demand by appropriately recognizing the depressing force applied to the brake pedal and selectively activating the electromagnetic brake and the disc brake (or drum brake) accordingly.

DESCRIPTION OF THE PREFERRED EMBODIMENTS

Preferred embodiments of the present invention will now be described with reference to accompanying drawings.

Figure 1:
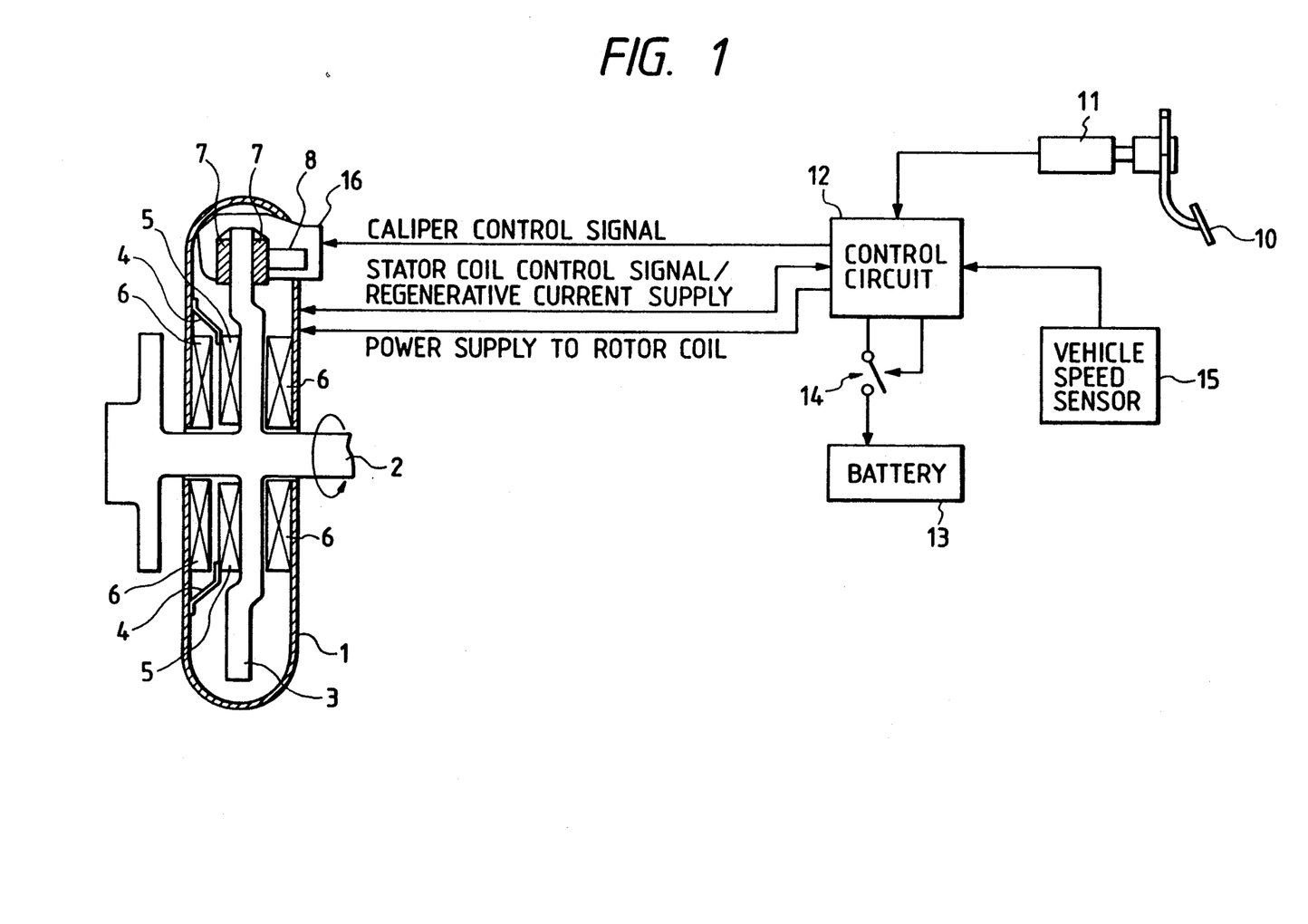
FIG. 1 is a schematic block diagram showing a brake system constructed according to a first embodiment of the present invention.

As shown in FIG. 1, the brake system of the first embodiment is provided with a stroke depression sensor 11 connected to a brake pedal 10. The stroke depression sensor 11 is a detector which detects the depression force applied to the brake pedal in terms of the distance the brake pedal is depressed per unit time and a total depression distance of the brake pedal 10. A stator 1 includes a housing which is oval in cross section, with a shaft 2, acting as a braked shaft, penetrating through a central opening in the housing and rotatably connected with a vehicle wheel (not shown). A disc-like rotor 3 (braked member) is secured to shaft 2 for rotation within the stator housing. Rotor coils 5 are mounted on the rotor 3 adjacent to shaft 2 and thus rotate with the rotor 3. The rotor coils 5 are contacted by brushes 4 carried by the stator housing so that the rotor coils can be electrically energized by a control circuit 12 described later. Stator coils 6 are secured to the inner surface of the stator housing on opposite sides of the rotor coils 5 in such a manner such that the stator coils 6 are in closely spaced axial relation with the rotor coils 5.

The rotor coils 5 produce an electromagnetic force when supplied with electric power through the brushes 4, and the electromagnetic force generates a rotational force in opposition to the rotational direction of shaft 2, so as to provide electromagnetic brake operation.

The material of the rotor coils 5 and stator coils 6 may preferably be a conductive material with low resistance. Particularly, if a superconductive material is utilized for the material of the coils of the electromagnetic brake, the brake apparatus can be manufactured small in size and light in weight.

A peripheral portion of the rotor 3 is located between a caliper 16 disposed inside the stator housing 1, and an electric actuator 8 driven by a motor is installed with the caliper 16. A pair of pads 7 (friction member) are fitted to ends of the electric actuator 8 so that the pads 7 frictionally engage opposed surfaces of the rotor 3 upon actuation of the electric actuator 8 to achieve disc brake operation. The electric actuator 8 has a mechanism which converts an electric force into a force of hydraulic pressure in the caliper 16 as disclosed, for example, in Japanese Patent Application No. Hei. 3-221872 proposed by the present inventor. Otherwise, the electric actuator 8 may be of a type having an electrically powered mechanism for pressing the pads against the rotor surfaces.

Control circuit 12 includes a microprocessor of the 8-bit or 16-bit type and a micro-computer system with a memory such as a RAM, ROM and the like. As shown in FIG. 1, the control circuit 12 receives detection signals inputs from the stroke depression sensor 11 and a vehicle speed sensor 15 or the like, processes these signals in accordance with a predetermined program, and produces a power signal for controlling caliper 16 and a power signal for energizing rotor coils 5. Further, the control circuit 12 also controls a switch 14 for selectively connecting a battery 13 to the control circuit. When switch 14 connects the battery 13 to the control circuit, regenerative current generated by the stator coils 6 is utilized to charge the battery. That is, the stator coils 6 function as generator coils in which current (regenerative current) is induced by the rotation of the rotor 3. This regenerative current is supplied to an electric load, such as the battery 13, thereby to improve electromagnetic braking force and also to improve the service life of the battery 13.

when the vehicle speed decreases below a predetermined value during brake operation, the control circuit 12, which receives a detection signal from the vehicle speed sensor 15, energizes caliper actuator 8 such that only the disc brake (or drum brake) is actuated to produce a brake operation. This is because electromagnetic braking is not suitable for a rapid stop of the vehicle or a stop from low vehicle speeds, although it is suitable for a relatively smooth brake operation since it is actuated by electromagnetic forces. On the other hand, a disc brake (or drum brake) system is not suitable for repeated braking, although it is appropriate for rapid braking of the vehicle to a complete stop.

The vehicle speed sensor 15 may be a known Doppler radar type, which is not described in detail in this specification.

Figure 2:
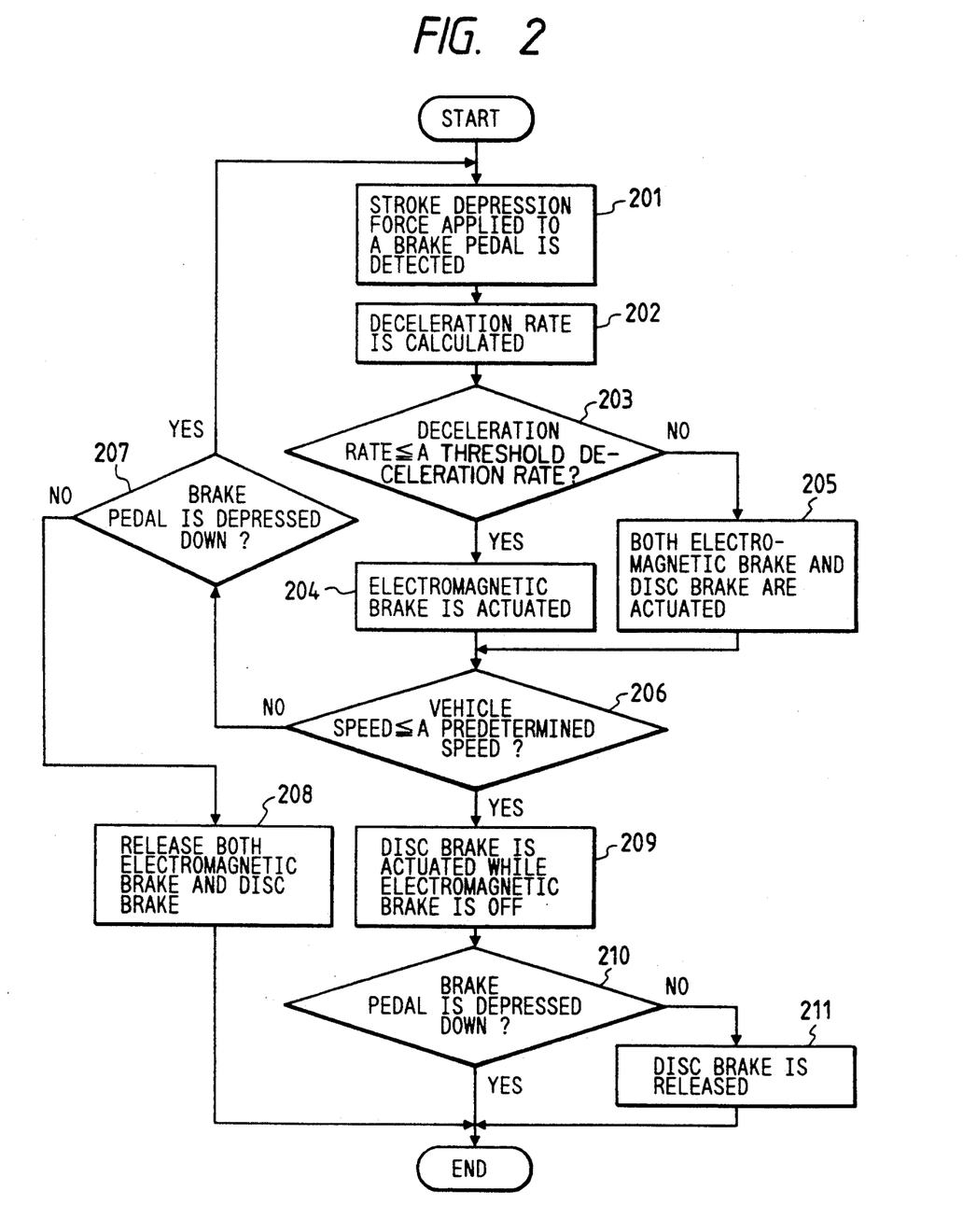
FIG. 2 is a flowchart showing the control operation of a control circuit included in the first embodiment shown in FIG. 1.

The specific control operation of the control circuit 12 according to the first embodiment of the invention will be described below with reference to FIG. 2.

When a detection signal from the stroke depression sensor 11 is received (STEP 201), the control circuit 12 determines a deceleration rate the vehicle driver expects in accordance with the detected depression force (STEP 202) exerted on the brake pedal 10. This deceleration rate determination is performed using a table of preset deceleration rates versus depression forces. This table is stored in the RAM or ROM of the micro-computer system, so that an appropriate deceleration rate established for the detected depression force signal is selected to determine the power signal outputs generated by the control circuit.

In the next step, it is Judged whether the calculated deceleration rate is equal to or lower than a reference threshold deceleration rate. A threshold deceleration rate of, for example, 0.2 G, represents the situation when the vehicle driver depresses the brake pedal 10 expecting a gradual deceleration under normal driving conditions.

If the deceleration rate calculated in STEP 202 is determined to be equal to or lower than the 0.2 G threshold rate in STEP 203, the control circuit 12 outputs only a power signal to rotor coils 5, thus to actuate the electromagnetic brake for a relatively calm brake operation (STEP 204). In this operation, the control circuit 12 closes the switch 14 while the electromagnetic brake is actuated to connect the stator coils 6 to the battery 13 and, accordingly, an electromagnetic force in opposition to the rotational direction of the rotor coils 6 is generated. Owing to this electromagnetic force, rotation of the rotor coils 5 is braked. The stator coils 6 thus perform as a generator in this operation to generate a regenerative current for charging the battery 13 through the closed switch 14.

On the other hand, if the calculated deceleration rate is judged to be larger than the threshold deceleration of rate of 0.2 G in STEP 203, the control circuit 12 judges that the driver requires a relatively rapid braking operation and outputs power signals to both the rotor coils 5 and actuator 8 of the caliper 16 to obtain multiple braking by the electromagnetic brake and the disc brake (STEP 205) to rapidly decelerate the vehicle.

In addition, the control circuit 12, in response to the signal from vehicle speed sensor 15, determines in STEP 206 when the vehicle speed becomes equal to or lower than a threshold speed value (10 km/h, for example). If the brake pedal 10 is continuously depressed while the vehicle speed is greater than the threshold speed value (STEP 207), the operation returns to the STEPS 201 and STEP 202 to 206 are repeated. If the brake pedal 10 is not depressed (STEP 207), both the electromagnetic and the disc brakes are released (STEP 208). In STEP 206, when the vehicle speed is equal to or lower than the threshold speed value, the control circuit 12 only outputs a power signal to caliper 16, and therefore only the disc brake (electric actuator 8) is actuated (STEP 209).

In STEP 210, it is detected if the brake pedal 10 continues to be depressed, and, if so, remains depressed, braking action by the disc brake continues. On the other hand, if brake pedal 10 is no longer depressed, the disc brake (electric actuator 8) is released (STEP 211).

Figure 3:
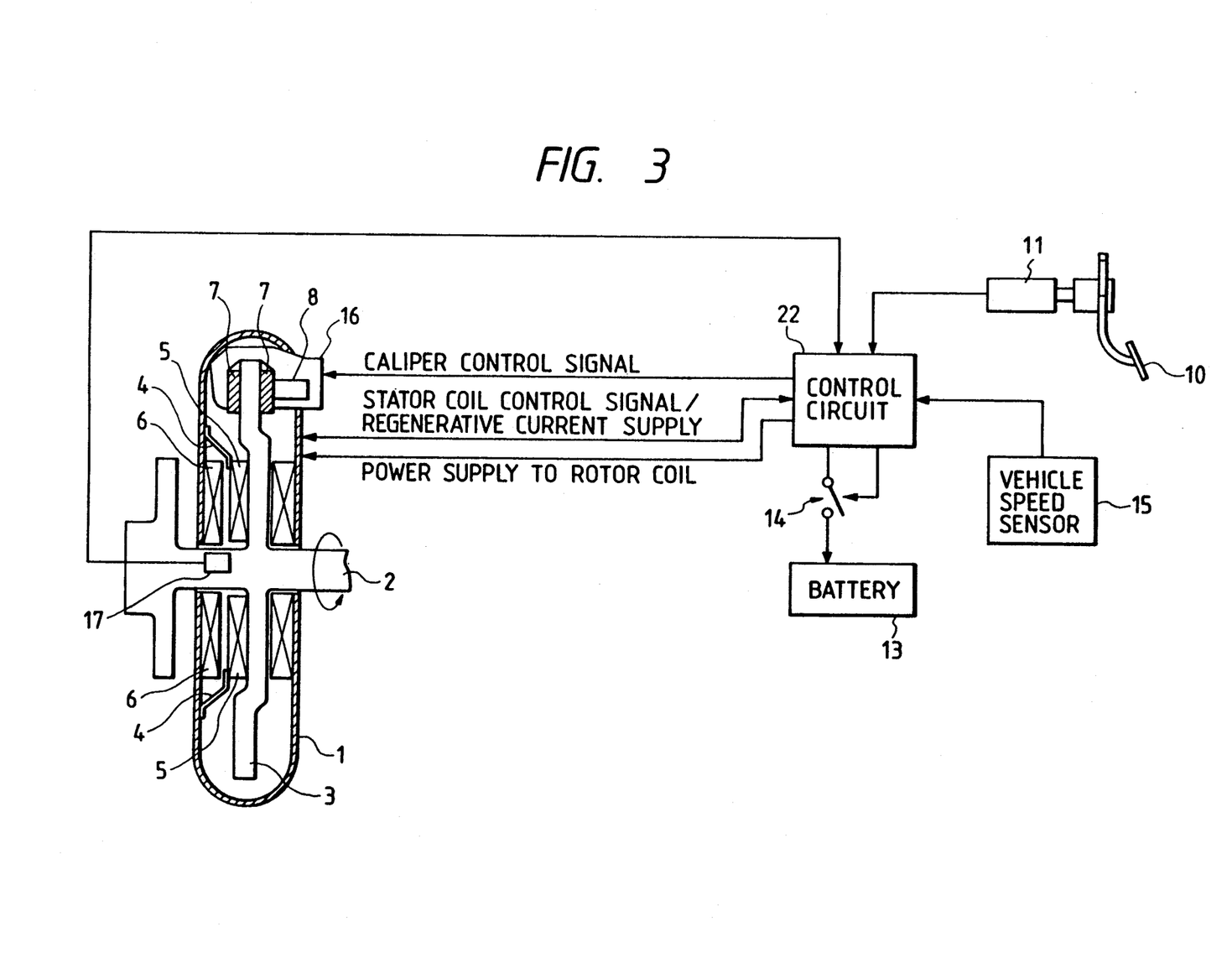
FIG. 3 is a schematic block diagram showing a brake system constructed according to a second embodiment of the present invention.

The brake apparatus of the second embodiment of the present invention shown in FIG. 3 is constructed similarly to the first embodiment shown in FIG. 1. Accordingly, like parts and components are designated by the same reference numerals.

As shown in FIG. 3, a torque sensor 17 is disposed on the shaft 2. This torque sensor may comprise a strain gauge which detects torsional stress in shaft 2. Since torsional stress of the shaft 2 is substantially proportional to the brake force applied thereto, brake torque is indicated by an electric signal developed by the torque sensor. The control circuit 22 includes a micro-processor of 8-bit or 16-bit type and a micro-computer system with a memory such as a RAM, ROM and the like. As shown in FIG. 3, the control circuit receives as inputs detection signals from the stroke depression sensor 11, vehicle speed sensor 15 and torque sensor 17, processes these signals in accordance with a predetermined calculation program, and selectively outputs power signals for actuating caliper 16 and energizing the rotor coils 5.

Figure 4:
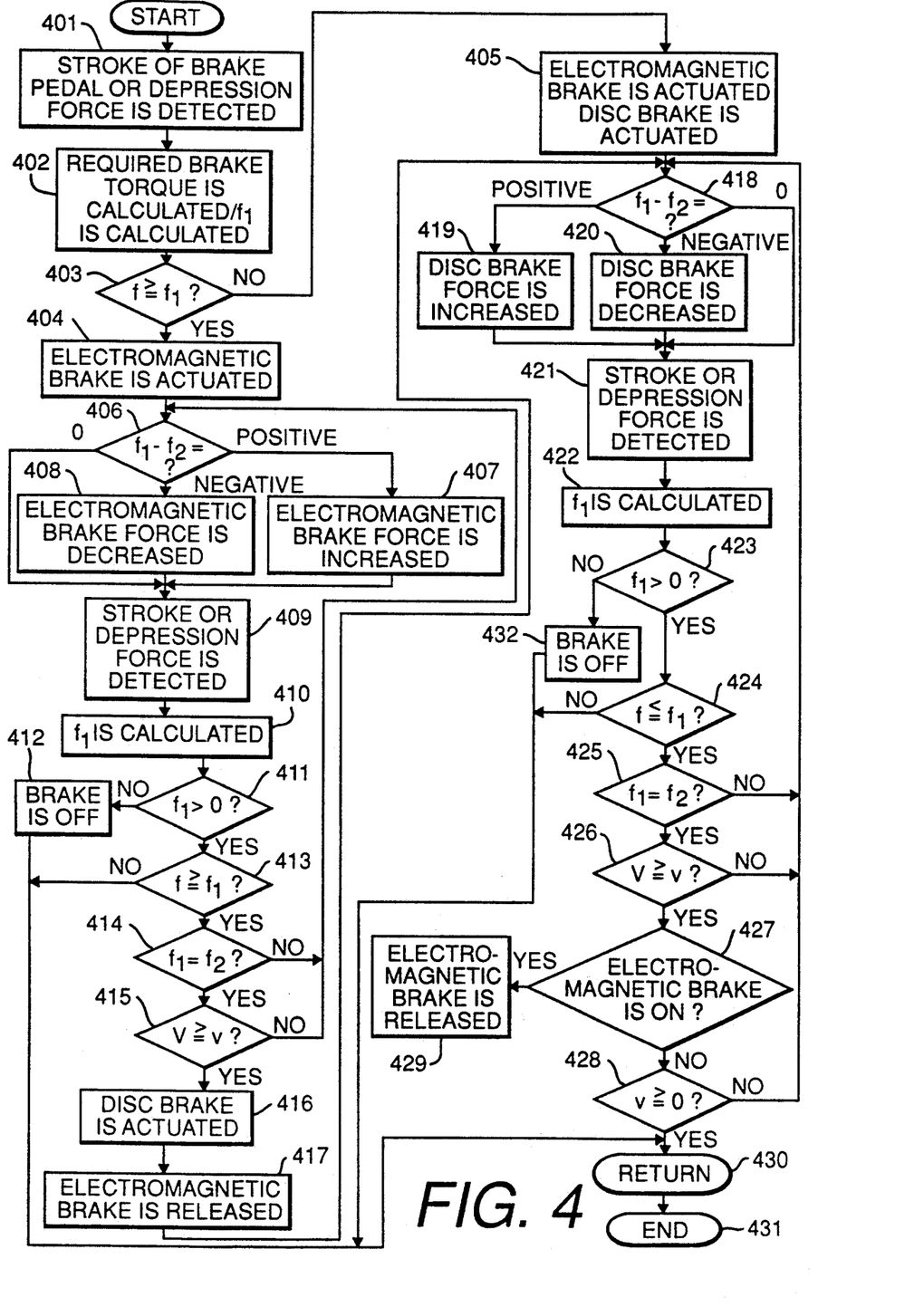
FIG. 4 is a flowchart showing the control operation of a control circuit included in the second embodiment shown in FIG. 3.

The specific control operation of the control circuit 22 according to the second embodiment of the invention will be described below with reference to FIG. 4.

When a detection signal from the stroke depression sensor 11 is received (STEP 401), the control circuit 22 calculates a deceleration rate the vehicle driver expects in accordance with the detected depression force on the brake pedal (STEP 402). This calculation of the deceleration rate is performed in the manner described above for the first embodiment of FIGS. 1 and 2.

In the next step, it is Judged whether the calculated deceleration rate is equal to or lower than a reference threshold deceleration rate. Again, the threshold deceleration rate is assumed to be, for example, 0.2 G.

In STEP 403, it is judged whether a critical torque (f) occurring during maximum operation of the electromagnetic brake is larger than a brake torque (f1) which the vehicle driver expects. If it is judged "Y (Yes)" in STEP 403, then the operation goes on into STEP 404 where only the electromagnetic brake is operated. If it is judged "N (No)", on the other hand, both the electromagnetic brake and the disc brake are operated (STEP 405).

In STEP 406, subsequent to STEP 404, it is judged if a value derived by subtracting an actual torque f2 from the expected brake torque f1 is a positive or negative value or equal to 0. If the value is positive, the operation goes next to STEP 407, while the operation goes next to STEP 408 in case of a negative value. The operation otherwise goes next to STEP 409 if the subtracted value is equal to 0. In STEP 407, electromagnetic braking force is increased, whereas electromagnetic braking is decreased in STEP 408. On the other hand, in STEP 409, a stroke distance of the brake pedal or a depression force applied to the brake pedal is detected to calculate the brake torque f1 expected by the driver (STEP 410).

Then the operation continues to STEP 411 where it is judged whether the expected torque f1 is larger than 0. If the torque f1 is not larger than 0 (branch "N"), brake operation is terminated (STEP 412). On the other hand, if the expected torque f1 is larger than 0 (branch "Y") then it is judged if the critical torque (f) during maximum electromagnetic brake operation is larger than the brake torque f1 the vehicle driver expects. In this judgement, if the critical torque (f) is smaller than the expected brake torque f1 (branch "N") the operation goes to the next STEP 403. On the other hand, if the critical torque (f) during the maximum electromagnetic brake operation is equal to or larger than the brake torque f1 the driver expects (branch "Y") the operation proceeds to STEP 414 where it is Judged whether the expected torque f1 is equal to the actual torque. If it is Judged negative (branch "N") the operation returns to STEP 406, and operation proceeds to STEP 415 as long as positive judgements are satisfied (branch "Y").

In STEP 415 it is Judged if a lower critical speed V available for the electromagnetic brake is equal to or larger than the vehicle speed $v$. This judgement is necessary because the electromagnetic brake is effective when the vehicle speed is high, however, it is extremely ineffective at low vehicle speeds, and thus no significant braking can be expected from the electromagnetic brake. If it is judged in the negative (branch "N") in STEP 415, then the operation returns to STEP 406, whereupon it proceeds to STEP 416 as long as positive judgments are satisfied (branch "Y"). The disc brake is actuated in STEP 416 and then the electromagnetic brake is released in STEP 417.

In STEP 418, subsequent to STEP 417, it is judged if a value derived by subtracting an actual torque f2 from the expected brake torque f1 is a positive or negative value or equal to 0. If the value is positive the operation goes next to STEP 419, while it goes next to STEP 420 in case of a negative value. The operation otherwise goes to STEP 421 if the subtraction value is equal to 0. In STEP 419 the force applied to the disc brake (actuator 8) is increased, whereas it is decreased in STEP 420. On the other hand, in STEP 421, a stroke of the brake pedal or a depression force applied to the brake pedal is detected to calculate the brake torque f1 expected by the driver (STEP 422), and then operation proceeds to STEP 423 where it is Judged whether the expected brake torque f1 is larger than 0. If it is Judged negative in STEP 423 (branch "N"), brake operation is terminated in STEP 432. However, the operation proceeds to STEP 424 in the case of a positive Judgement (branch "Y") where it is judged whether the critical torque (f) during the maximum operation of the electromagnetic brake is smaller than the brake torque f1 expected by the vehicle driver. If the critical torque (f) during the maximum operation of the electromagnetic brake is smaller than the expected brake torque f1 (branch "Y"), then the operation goes to STEP 425 and proceeds to STEP 430.

In STEP 425, it is judged whether the critical torque (f) during maximum operation of the electromagnetic brake is equal to the brake torque (fl) the vehicle driver expects, and if the result is negative (branch "N") the operation returns to STEP 418 while it proceeds to STEP 426 in case of positive judgments (branch "Y"). In STEP 426, it is judged if the lower critical speed V available for electromagnetic braking is equal to or larger than the vehicle speed v, and the operation goes back to STEP 418 in case of negative judgments (branch "N"), while it proceeds to STEP 427 in case of positive judgments (branch "Y"). In STEP 427, it is judged whether the electromagnetic brake is actuated or not and, if "Yes", then the operation goes to STEP 429 where the electromagnetic brake is released. On the other hand, if a "No" in STEP 427, the operation proceeds to STEP 428 where it is judged if the vehicle speed v is zero. If the vehicle speed v is zero then the operation goes to STEP 430 and then to end STEP 431, whereas it goes back to STEP 418 in case of a negative Judgement in STEP 428.

As described above, according to the present invention, brake operation is selected in accordance with the magnitude of the depression force applied to the brake pedal 10 by the driver. That is, if it is Judged that the driver expects a relatively calm braking operation, braking is carried out only by the electromagnetic brake. On the other hand, if a rapid brake operation is required to avoid a collision or the like, both the electromagnetic brake and the disc brake (electric actuator 8) are operated to brake the vehicle. Subsequently, at the point when the vehicle speed becomes sufficiently slow, the electromagnetic brake is released whiled maintaining actuation of the disc brake (actuator 8) to finally stop the vehicle. Since these controls are selected in accordance with the degree of depression force applied to the brake pedal, vehicle speed and/or the brake torque, stable and safe breaking operation is achieved.

Further, according to the present invention, the brake system requires no auxiliary brake system such as an anti-lock brake system for avoiding slippage of the vehicle wheels or a traction control system for preventing a slippage during the acceleration of the vehicle, and no separate actuator, but merely requires proper arrangement of the software program in the control circuit 12 (22). Therefore, stable and safe braking operation of the vehicle can be carried out with a small number of necessary components and at a low manufacturing cost.

According to the present invention, since the electromagnetic brake and the disc brake are electrically operated, brake control can be achieved without brake fluid lines and with high reliability. Further, since brake force is controlled in accordance with brake torque, controlled braking can be obtained in complete harmony with the driver's perceived braking needs.

In the first and second embodiments described above, the threshold deceleration rate was assumed to be 0.2 G and the threshold vehicle speed was assumed to be 10 km/h. However, the invention is not limited thereto or thereby. Further, while a Doppler sensor is cited as one example of a speed sensor, other types of speed sensor may be mounted to a vehicle wheel or drive shaft for detecting vehicle speed. Furthermore, instead of disc brakes, the invention may also be applied to a drum braking system in which a drum-shaped rotor and an electric actuator for frictionally engaging the drum-shaped rotor are provided.

What is claimed is:

1. A brake apparatus for a vehicle having a brake pedal, a wheel, and a shaft connected to the wheel, the brake apparatus comprising:
   a stator;
   a rotor fixed on the shaft;
   a rotor coil mounted by said rotor;
   a stator coil mounted by said stator;
   a brush having an end contacting said rotor coil and a base part fixed to said stator;
   a first sensor coupled with the brake pedal for producing a first signal indicative of a depressing force exerted on the brake pedal by a vehicle driver;
   an electrical actuator operable, upon activation, to press a pad against a surface of said rotor and thereby produce frictional braking of the vehicle wheel; and
   control means electrically connected to said first sensor, said actuator, and one of said stator and rotor coils, said control means selectively applying electrical power to activate said actuator and electrical power to energize said one of said stator and rotor coils to produce electromagnetic braking of the vehicle wheel, such as to coordinate frictional braking and electromagnetic braking in a manner to decelerate the vehicle according to a braking demand of the driver indicated by said first signal.

2. A brake apparatus for a vehicle having a brake pedal, a wheel, and a shaft connected to the wheel, the brake apparatus comprising:
   a stator;
   a rotor fixed on the shaft;
   a rotor coil mounted by said rotor;
   a stator coil mounted by said stator;
   a first sensor coupled with the brake pedal for producing a first signal indicative of a depressing force exerted on the brake pedal by a vehicle driver;
   an electrical actuator operable, upon activation, to press a pad against a surface of said rotor and thereby produce frictional braking of the vehicle wheel; and
   control means electrically connected to said first sensor, said actuator, and one of said stator and rotor coils, said control means selectively applying electrical power to activate said actuator and electrical power to energize said one of said stator and rotor coils to produce electromagnetic braking of the vehicle wheel, such as to coordinate frictional braking and electromagnetic braking in a manner to decelerate the vehicle according to a braking demand of the driver indicated by said first signal;
   wherein said control means includes processing means for processing said first signal in accordance with a predetermined program to select one of a first brake control, wherein only electromagnetic braking is produced, and a second brake control, wherein both electromagnetic braking and frictional braking are produced.

3. The brake apparatus of claim 2, further comprising a switch controlled by said control means to connect another of said stator and rotor coils to charge a vehicle battery during electromagnetic braking.

4. The brake apparatus of claim 3, further comprising a torque sensor for producing a second signal indicative of a torque applied to said shaft,
   wherein said control means selects one of said first and second brake controls by processing said first and second signals.

5. The brake apparatus of claim 4, further comprising switch means controlled by said control means to connect another of said stator and rotor coils to charge a vehicle battery during electromagnetic braking.

6. The brake apparatus of claim 5, further comprising a second sensor for detecting vehicle speed,
wherein, when the vehicle speed is lower than a predetermined value, said control means selects a third brake control wherein only said electrical actuator is activated.

7. The brake apparatus of claim 2, further comprising a second sensor for producing a second signal indicative of vehicle speed, said control means including means responsive to said second signal for selecting a third brake action, wherein only frictional braking is produced, when the vehicle speed is less than a predetermined minimum speed threshold.

8. The brake apparatus of claim 6, or 7, wherein said second sensor comprises a Doppler sensor.

9. The brake apparatus of claim 6 or 7, wherein said second sensor is directly mounted to said shaft.

10. The brake apparatus of claim 2, wherein said rotor is a disc-shaped brake member.

11. The brake apparatus of claim 2, wherein said control means includes a micro-processor and data storage means.

12. The brake apparatus of claim 2, wherein said rotor coil and stator coil are formed of a conductive material of low resistance.

13. The brake apparatus of claim 2, wherein said electric actuator comprises a mechanism for converting electric force into hydraulic pressure.

14. The brake apparatus of claim 2, wherein said electric actuator comprises a mechanisms for converting electric force into a force pressing the pad against said rotor.

15. The brake apparatus of claim 2, wherein said processing means includes first means for determining a demand deceleration rate indicative by said first signal and second means for comparing the demand deceleration rate to a predetermined threshold deceleration rate, said control means selecting said first brake control when the demand deceleration rate is less than the threshold deceleration rate and selecting said brake second control when the demand deceleration rate is greater than the threshold deceleration rate.

16. The brake apparatus of claim 15, further comprising a second sensor for producing a second signal indicative of vehicle speed, said control means including means responsive to said second signal for selecting a third brake action, wherein only frictional braking is produced, when the vehicle speed is less than a predetermined minimum speed threshold.

* * * * *

UNITED STATES PATENT AND TRADEMARK OFFICE
CERTIFICATE OF CORRECTION

PATENT NO. : 5,333,706
DATED : August 02, 1994
INVENTOR(S) : Masatomo MORI

It is certified that error appears in the above-indentified patent and that said Letters Patent is hereby corrected as shown below:

Claim 4, column 8, line 63, "claim 3" should read
--claim 2--.

Claim 15, column 10, line 11, "of" should read
--according to--.

Signed and Sealed this

Twenty-eight Day of March, 1995

Attest:

BRUCE LEHMAN

Attesting Officer    Commissioner of Patents and Trademarks